(12) United States Patent
Takeuchi et al.

(10) Patent No.: US 12,704,772 B2
(45) Date of Patent: Aug. 11, 2026

(54) PROJECTION METHOD AND PROJECTION SYSTEM

(71) Applicant: SEIKO EPSON CORPORATION, Tokyo (JP)

(72) Inventors: Kota Takeuchi, Azumino (JP); Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 367 days.

(21) Appl. No.: 18/226,092

(22) Filed: Jul. 25, 2023

(65) Prior Publication Data

US 2024/0036447 A1 Feb. 1, 2024

(30) Foreign Application Priority Data

Jul. 26, 2022 (JP) ................................ 2022-118509

(51) Int. Cl.

| | |
|---|---|
| ***G03B 21/14*** | (2006.01) |
| ***G03B 17/54*** | (2021.01) |
| ***G09G 3/00*** | (2006.01) |
| ***H04N 9/31*** | (2006.01) |

(52) U.S. Cl.

CPC ........... *G03B 21/142* (2013.01); *G03B 17/54* (2013.01); *G03B 21/145* (2013.01); *G09G 3/001* (2013.01); *G09G 2320/0613* (2013.01); *G09G 2340/04* (2013.01)

(58) Field of Classification Search

CPC .... G03B 21/14; G03B 21/142; G03B 21/145; H04N 9/3188

See application file for complete search history.

(56) References Cited

U.S. PATENT DOCUMENTS

| | | | |
|---|---|---|---|
| 2011/0164192 A1 | 7/2011 | Ozawa | |
| 2017/0295349 A1 | 10/2017 | Kasuga et al. | |
| 2017/0310938 A1 | 10/2017 | Okamura | |
| 2023/0020363 A1 | 1/2023 | Okamoto et al. | |
| 2023/0102878 A1* | 3/2023 | Wang | G01S 7/4915 348/744 |

FOREIGN PATENT DOCUMENTS

| | | |
|---|---|---|
| JP | 2011-141411 A | 7/2011 |
| JP | 2013-007818 A | 1/2013 |

(Continued)

OTHER PUBLICATIONS

Intel, "Basic concepts of the homography explained with code," Mar. 22, 2023, [URL: https://docs.opencv.org/4.x/d9/dab/tutorial_homography.html].

(Continued)

*Primary Examiner* — Ryan D Howard
(74) *Attorney, Agent, or Firm* — Oliff PLC

(57) ABSTRACT

A projection method includes generating projection size information including at least one of first size information representing a distance between two dots included in a first projection image displayed on a projection surface, and second size information representing an area of a first image included in the first projection image based on information output from a sensor, and displaying a second projection image including an image showing a numerical value represented by the projection size information on the projection surface.

12 Claims, 7 Drawing Sheets

(56) References Cited

FOREIGN PATENT DOCUMENTS

| | | | |
|---|---|---|---|
| JP | 2015-056675 | A | 3/2015 |
| JP | 2017-191307 | A | 10/2017 |
| JP | 2017-200104 | A | 11/2017 |
| JP | 2022-077270 | A | 5/2022 |

OTHER PUBLICATIONS

Malis et al., "Deeper understanding of the homography decomposition for vision-based control," Research Report No. 6303, INRIA, Sep. 2007, pp. 1-90.
[online], "How to select a projector screen", The Wayback Machine, <https://web.archive.org/web/20150802001259/ http://shopping.geocites.jp:80/screen-theaterhouse/screen_choose_aspect.html>> p. 2 (acquired on Jun. 12, 2026). [Discussed in NPL 4].
[online], "Recommended display of digital audio player", The Wayback Machine, https://web.archive.org/web.20081217150714/https://susume-project.com:80/susume-digi/menu_point/menu3_display.htm> p. 1. 06 (Dec. 17, 2008). [Discussed in NPL 4].
[online], "How to check and select the size of a notebook computer", The Wayback Machine, https://web.archive.org/web/20211127054435/https://life-notenki.com/others/notepc-and-tablet/8388.htm> (Nov. 27, 2021), p. 2. 06. [Discussed in NPL 4].
Jun. 12, 2026 Notice of Reasons of Refusal issued in Japanese Patent Application No. 2022-118509.

* cited by examiner

PROJECTION METHOD AND PROJECTION SYSTEM

The present application is based on, and claims priority from JP Application Serial Number 2022-118509, filed Jul. 26, 2022, the disclosure of which is hereby incorporated by reference herein in its entirety.

BACKGROUND

1. Technical Field

The present disclosure relates to a projection method and a projection system.

2. Related Art

When displaying an image on a projection surface using a device such as a projector, in general, the size of the image displayed on the projection surface changes in accordance with a distance between the device and the projection surface. There has been developed such a technology focusing attention on the size of the image to be displayed on the projection surface by projecting light as described above. For example, in JP-A-2011-141411 (Document 1), there is disclosed a projector which makes the size of the image to be displayed constant by adjusting image data in accordance with a distance from an image projection unit for projecting the image on the projection surface to the projection surface even when the distance changes.

The projector described in Document 1 is not capable of displaying the size of the image displayed on the projection surface. Therefore, it is necessary for the user to, for example, actually measure the size of the image on the projection surface in order to figure out the size of the image displayed, which requires great care.

SUMMARY

A projection method according to an aspect of the present disclosure includes generating projection size information including at least one of first size information representing a distance between two dots included in a first projection image displayed on a projection surface, and second size information representing an area of a first image included in the first projection image based on information output from a sensor, and displaying a second projection image including an image showing a numerical value represented by the projection size information on the projection surface.

A projection system according to an aspect of the present disclosure includes a processing device, a sensor, and a projection mechanism, wherein the processing device executes generating projection size information including at least one of first size information representing a distance between two dots included in a first projection image displayed on a projection surface, and second size information representing an area of a first image included in the first projection image based on information output from a sensor, and controlling the projection mechanism to display a second projection image including an image showing a numerical value represented by the projection size information on the projection surface.

DESCRIPTION OF AN EXEMPLARY EMBODIMENT

Figure 1:
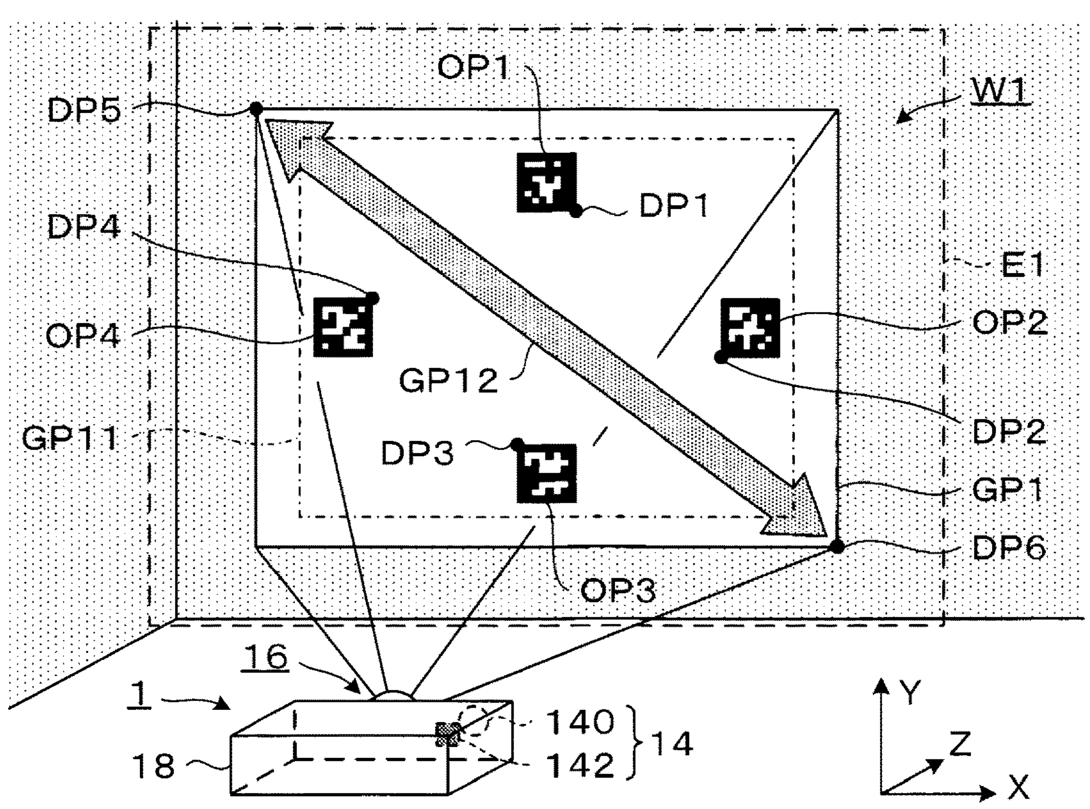
FIG. 1 is a schematic diagram illustrating a state in which a projection image GP1 is displayed.

A preferred embodiment related to the present disclosure will hereinafter be described with reference to the accompanying drawings. It should be noted that in the drawings, dimensions and scale sizes of each part are different from the reality in some cases, and some portions are shown schematically in order to make understanding easy. Further, the scope or the spirit of the present disclosure is not limited to the embodiment unless there is a particular description of limiting the present disclosure in the following explanation.

1. First Embodiment

In the first embodiment, there is described a projection method and a projection system according to the present disclosure illustrating a projector which calculates the sizes related to a projection image displayed on a projection surface based on taken image information output from a camera for taking the projection image, and then displays numerals representing the sizes thus calculated on the projection surface. Here, the numerals representing the sizes thus calculated are an example of an image showing numerical values represented by projection size information. The numerals are used in the present embodiment, but these are not a limitation. For example, it is possible to express the sizes related to the projection image using a character such as an alphabet.

1.1. Outline of Projector

Figure 2:
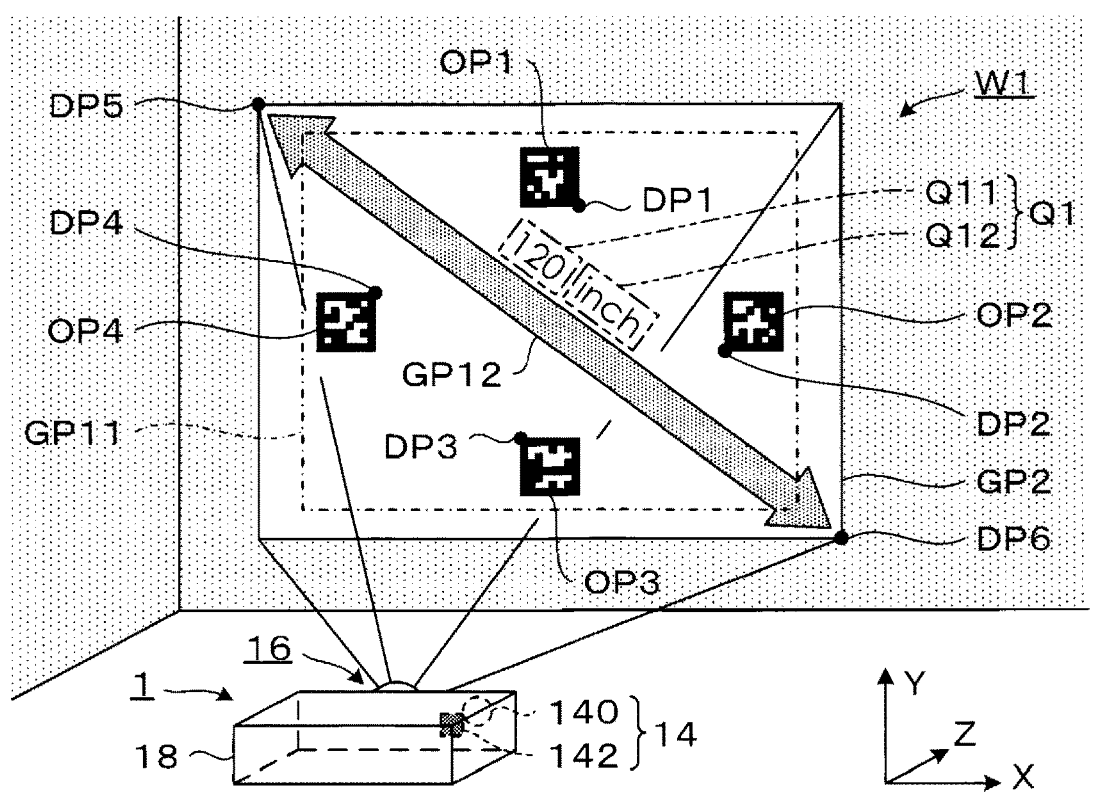
FIG. 2 is a schematic diagram illustrating a state in which a projection image GP2 is displayed.

An outline of a projector 1 according to the first embodiment will hereinafter be described with reference to FIG. 1 and FIG. 2. FIG. 1 is a schematic diagram illustrating a state in which a projection image GP1 is displayed. FIG. 2 is a schematic diagram illustrating a state in which a projection image GP2 is displayed.

The projector 1 is provided with a chassis 18. The chassis 18 is provided with a projection mechanism 16 for projecting projection light to thereby display an image on a projection surface, and a camera 14 for making the image displayed on the projection surface by the projection mechanism 16. The camera 14 is provided with an imaging lens 140 and an imaging element 142.

It should be noted that the images displayed on the projection surface with the projection light projected from the projector 1 are hereinafter referred to collectively as a "projection image GP."

The projector 1 controls the projection mechanism 16 to thereby display the projection image GP1 on a wall surface W1.

The projection image GP1 includes an image GP11 and an image GP12. The image GP11 includes an image object OP1, an image object OP2, an image object OP3, and an image object OP4. The image objects OP1 through OP4 are each an image having a geometric pattern. Further, the image objects OP1 through OP4 each have a plurality of vertexes. Further, the image GP11 has a plurality of vertexes. The image GP12 is an image which has arrow shapes at both ends, and a longitudinal direction of which extends along one of two diagonal lines provided to the projection image GP1. The image GP12 dots an upper left vertex viewed from the user and a lower right vertex viewed from the user out of the plurality of vertexes provided to the projection image GP1. Further, the image GP12 has a plurality of vertexes similarly to the image GP11.

Further, the projection image GP1 includes a dot DP1, a dot DP2, a dot DP3, a dot DP4, a dot DP5, and a dot DP6. The dot DP1 is located at one of the vertexes provided to the image object OP1. The dot DP2 is located at one of the vertexes provided to the image object OP2. The dot DP3 is located at one of the vertexes provided to the image object OP3. The dot DP4 is located at one of the vertexes provided to the image object OP4. The dot DP5 is located at an upper left vertex viewed from the user out of the vertexes of the projection image GP1 doted by the image GP12. The dot DP6 is located at a lower right vertex viewed from the user out of the vertexes of the projection image GP1 doted by the image GP12.

In FIG. 1 and FIG. 2, an axis parallel to a vertical direction is referred to as a Y axis. Out of directions parallel to the Y axis, a vertical direction is defined as a −Y direction, and a direction opposite to the −Y direction is defined as a Y direction. Further, an axis which is perpendicular to the Y axis, and which is parallel to an optical axis of the projection mechanism 16, is referred to as a Z axis. Out of directions parallel to the Z axis, a direction proceeding from the projector 1 toward the wall surface W1 is defined as a Z direction, and a direction opposite to the Z direction is defined as a −Z direction. Further, an axis perpendicular to the Y axis and the Z axis is referred to as an X axis. Out of directions parallel to the X axis, a direction proceeding from the image object OP4 toward the image object OP2 is defined as an X direction, and a direction opposite to the X direction is defined as a −X direction. An origin of an XYZ coordinate system coincides with an optical center of the projection mechanism 16. In other words, the XYZ coordinate system is a coordinate system representing positional relationships between dots with reference to the optical center of the projection mechanism 16. Further, the coordinate of a dot in the XYZ coordinate system is expressed as (x, y, z). Here, the value x represents the X coordinate of a dot in the XYZ coordinate system. Further, the value y represents the Y coordinate of a dot in the XYZ coordinate system. Further, the value z represents the Z coordinate of a dot in the XYZ coordinate system.

The camera 14 images an imaging area E1 including the projection image GP1 to thereby obtain a taken image. The projector 1 calculates a size related to the projection image GP1 displayed on the wall surface W1 such as a distance between the dot DP5 and the dot DP6, based on taken image information representing the taken image obtained by the camera 14. In the present embodiment, the distance between the dot DP5 and the dot DP6 coincides with a length of a diagonal line of the projection image GP1.

It is possible for the projector 1 to calculate a distance between arbitrary two dots included in the projection image GP1 as the size related to the projection image GP1. Further, it is possible for the projector 1 to calculate the area of the image included in the projection image GP1 such as the area of the image GP11, or the area of the image GP12, as the size related to the projection image GP1. In this case, the image GP11 or the image GP12 is an example of a "first image." In contrast, the image included in the projection image GP1 can coincide with the projection image GP1. In other words, it is possible for the projector 1 to calculate the area of the projection image GP1 as the size related to the projection image GP1. In this case, the image coinciding with the projection image GP1 is an example of the "first image." Further, the size related to the projection image GP1 is not limited to the aspects described above. It is possible to calculate a size of an arbitrary image set inside the projection image GP1 as the size related to the projection image GP1. It is sufficient for the arbitrary image to be an image the area of which can be calculated, and an arbitrary polygon surrounded by, for example, three or more dots can be adopted as the arbitrary image. In this case, the arbitrary image set inside the projection image GP1 is an example of the "first image."

When the distance between the dot DP5 and the dot DP6 is calculated as the size related to the projection image GP1, the projector 1 controls the projection mechanism 16 to thereby display the projection image GP2 on the wall surface W1.

The projection image GP2 is an image obtained by superimposing a character string Q1 on the projection image GP1. In other words, a variety of dimensions of the projection image GP2 coincide with those of the projection image GP1. The character string Q1 includes a number Q11 and a character string Q12. The number Q1 is an image representing the size related to the projection image GP1. Specifically, the number Q11 is an image including a number of "120" representing the distance between the dot DP5 and the dot DP6, namely the length of the diagonal line of the projection image GP1 and the projection image GP2. More specifically, the number Q11 is an image including a number displaying the length of the diagonal line of the projection image GP1 and the projection image GP2 in inches. The character string Q12 is a character string representing the unit of the size related to the projection image GP1. Specifically, the character string Q12 is a character string of "inch" which represents that the length of the diagonal line of the projection image GP1 and the projection image GP2 is displayed in inches.

It should be noted that when the area of the image included in the projection image GP1, such as the area of the image GP11, is calculated as the size related to the projection image GP1, the projector 1 controls the projection mechanism 16 to thereby display the projection image GP including the image representing the area of the image GP11 on the wall surface W1.

It is possible for the user to figure out the length of the diagonal line of the projection image GP1 (the projection image GP2) is 120 inches by checking the character string Q1. Further, it is possible for the user to easily adjust the size of the projection image GP into a desired size by changing the arrangement of the projector 1 while confirming the image representing the size related to the projection image GP displayed on the wall surface W1.

1.2. Configuration and Functions of Projector

A configuration and functions of the projector 1 according to the first embodiment will hereinafter be described with reference to FIG. 3 through FIG. 7.

Figure 3:
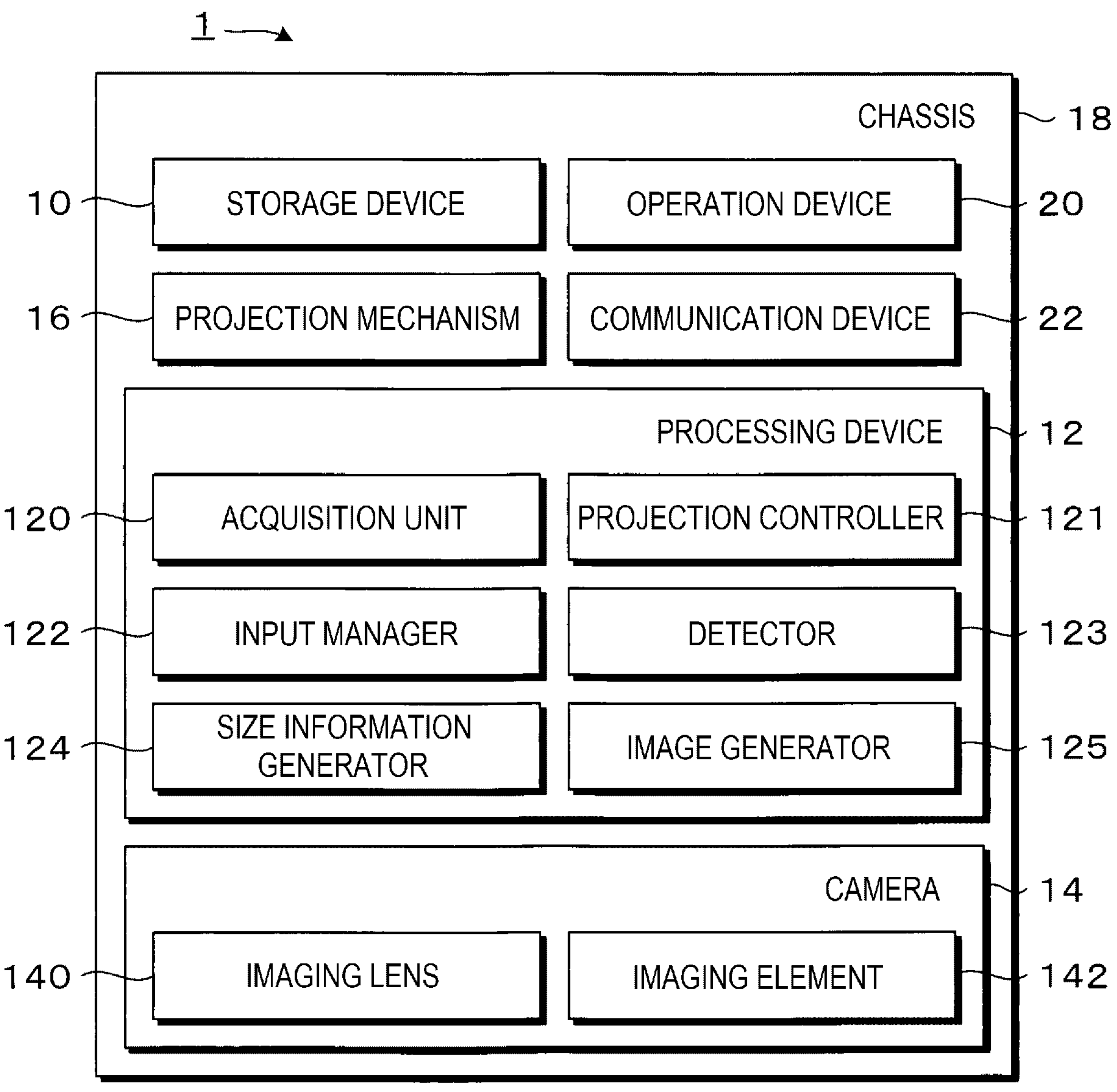
FIG. 3 is a block diagram showing a configuration of a projector 1 according to a first embodiment.

FIG. 3 is a block diagram showing a configuration of the projector 1 according to the first embodiment. The projector 1 is provided with a storage device 10 for storing a variety of types of information, a processing device 12 for controlling an operation of the projector 1, the camera 14 for taking the projection images GP displayed on the projection surface, the projection mechanism 16 for projecting the projection light to thereby display the projection images GP on the projection surface, the chassis 18 for housing a variety of components constituting the projector 1, an operation device 20 for receiving an input operation from the user, and a communication device 22 for executing communication with an external storage device, an external server, or the like. The processing device 12 has functions as an acquisition unit 120, a projection controller 121, an input manager 122, a detector 123, a size information generator 124, and an image generator 125.

The storage device 10 is configured including, for example, a volatile memory such as a RAM and a nonvolatile memory such as a ROM. Here, the term RAM is an abbreviation for Random Access Memory. Further, the term ROM is an abbreviation for Read Only Memory.

Figure 4:
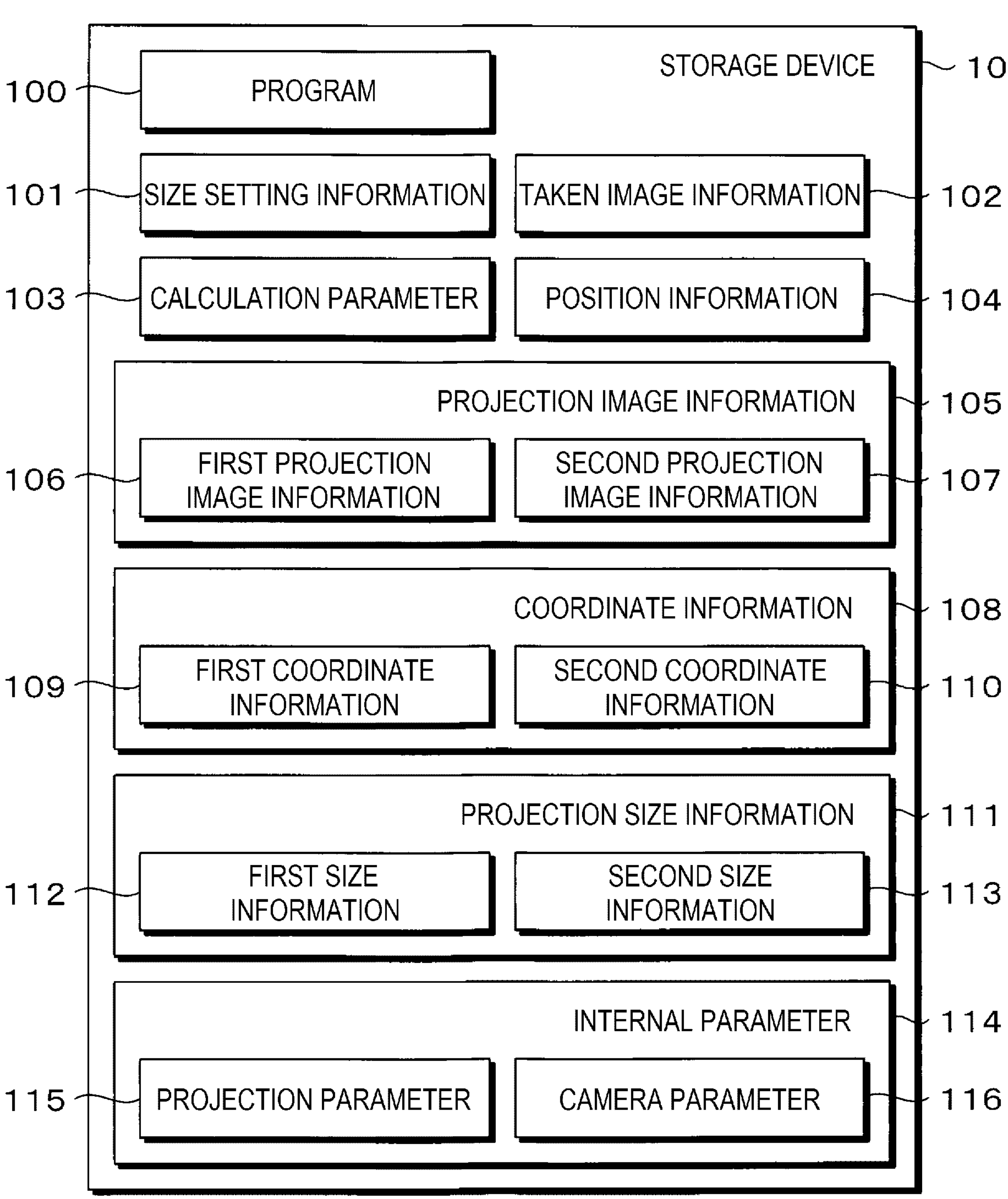
FIG. 4 is a block diagram showing a configuration of a storage device 10 related to the first embodiment.

FIG. 4 is a block diagram showing a configuration of the storage device 10 according to the first embodiment. The nonvolatile memory provided to the storage device 10 stores a program 100 which defines an operation of the projector 1, size setting information 101 representing a setting content related to display of the size related to the projection image GP displayed on the projection surface, taken image information 102 representing a result obtained by taking the projection image GP displayed on the projection surface, position information 104 representing a positional relationship between the camera 14 and the projection mechanism 16, projection image information 105 for forming projection light to be projected when displaying the projection image GP on the projection surface, coordinate information 108 representing a coordinate of a dot included in a variety of images, projection size information 111 representing the size related to the projection image GP displayed on the projection surface, an internal parameter 114 representing a variety of variables inherent in the device, and a calculation parameter 103 representing a variety of variables calculated based on the taken image information 102, the projection image information 105, and the internal parameter 114. The projection image information 105 includes first projection image information 106 and second projection image information 107. The coordinate information 108 includes first coordinate information 109 and second coordinate information 110. The projection size information 111 includes first size information 112 representing a distance between arbitrary two dots included in the projection image GP displayed on the projection surface, and second size information 113 representing the area of an image included in the projection image GP. The internal parameter 114 includes a projection parameter 115 representing a variable which derives from the projection mechanism 16, and a camera parameter 116 representing a variable which derives from the camera 14.

The projector 1 displays the number represented by the projection size information 111 on the projection surface. It should be noted that it is sufficient for the projection size information 111 to include at least one of the first size information 112 and the second size information 113. In the present embodiment, the projection size information 111 includes the first size information 112. The first size information 112 specifically shows a distance between the dot DP5 and the dot DP6. The number Q11 is an image for notifying the user of the numerical value represented by the first size information 112. Further, when the projection size information 111 includes the second size information 113, the second size information 113 represents, for example, the area of the image GP11 or the area of the image GP12.

The size setting information 101 includes information representing what size is represented by the numerical value displayed by the projector 1 on the projection surface. In other words, the size setting information 101 includes information designating which one of the first size information 112 and the second size information 113 the numerical value displayed by the projector 1 on the projection surface is based on. When the numerical value displayed on the projection surface is based on the first size information 112, the size setting information 101 includes information representing coordinates of two dots which correspond one-to-one to two dots to be a reference of a distance to be a display target, and which are included in an image represented by the projection image information 105. When the numerical value displayed on the projection surface is based on the second size information 113, the size setting information 101 includes information related to an image having the area to be the display target. When the numerical value displayed on the projection surface is based on the second size information 113, the size setting information 101 includes, for example, information representing an area proportion of the image which corresponds to the image having the area to be the display target, and which is included in the image represented by the projection image information 105, to the whole of the image represented by the projection image information 105.

The position information 104 is information representing, for example, a position vector T' representing the position of the camera 14 to the projection mechanism 16. The size of the vector T' coincides with a distance between an optical center of the camera 14 and the optical center of the projection mechanism 16.

Further, the volatile memory provided to the storage device 10 is used by the processing device 12 as a work area when executing the program 100.

It should be noted that a part or the whole of the storage device 10 can be provided to an external storage device, an external server, or the like. Further, a part or the whole of the variety of types of information stored in the storage device 10 can be one stored in advance in the storage device 10, or can also be one obtained from the external storage device, the external server, or the like. In the present embodiment, the storage device 10 is disposed in the chassis 18. Further, the position information 104 is stored in advance in the storage device 10.

Figure 5:
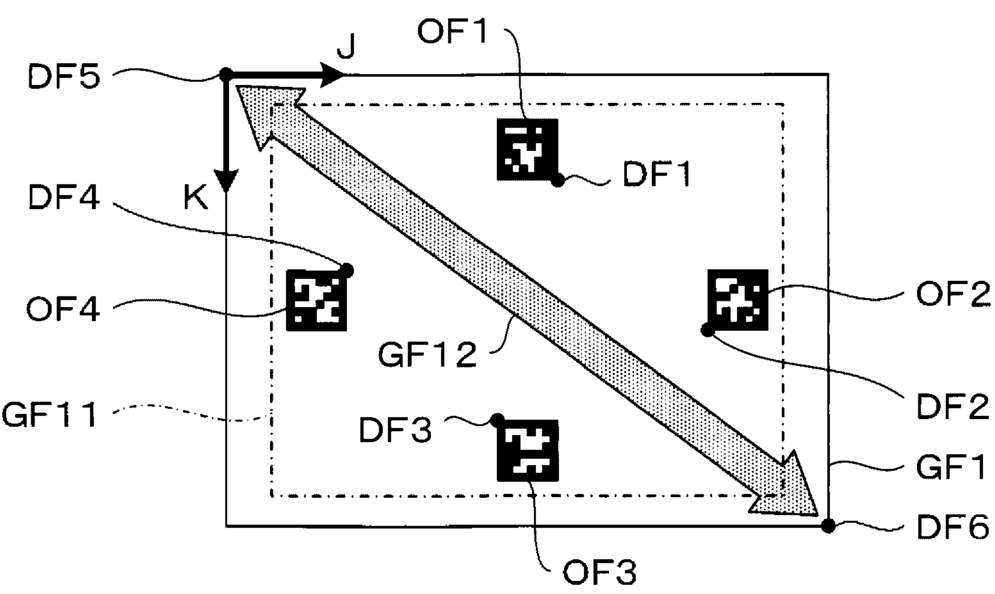
FIG. 5 is a schematic diagram illustrating an example of an image represented by first projection image information 106.

FIG. 5 is a schematic diagram illustrating an example of an image represented by the first projection image information 106. In the present embodiment, the first projection image information 106 represents an image GF1. The projector 1 makes the projection mechanism 16 project the projection light based on the first projection image information 106 to thereby display the projection image GP1 on the wall surface W1. In other words, the first projection image information 106 represents the image which does not include the image representing the size related to the projection image GP.

The image GF1 is an image corresponding to the projection image GP1. The image GF1 includes an image GF11 and an image GF12.

The image GF11 is an image corresponding to the image GP11. The image GF11 includes an image object OF1, an image object OF2, an image object OF3, and an image object OF4. The image object OF1 corresponds to the image object OP1. The image object OF2 corresponds to the image object OP2. The image object OF3 corresponds to the image object OP3. The image object OF4 corresponds to the image object OP4. The image objects OF1 through OF4 are each an image having a geometric pattern obtained by combining a plurality of rectangles with each other. In other words, the image objects OF1 through OF4 each have a plurality of vertexes. Further, the image GF11 has a plurality of vertexes.

The image GF12 is an image corresponding to the image GP12. The image GF12 is an image which has arrow shapes at both ends, and a longitudinal direction of which extends along one of two diagonal lines provided to the image GF1. The image GF12 dots an upper left vertex and a lower right vertex out of the plurality of vertexes provided to the image GF1. Further, the image GF12 has a plurality of vertexes similarly to the image GF11.

Further, the image GF1 includes a dot DF1, a dot DF2, a dot DF3, a dot DF4, a dot DF5, and a dot DF6. The dot DF1 is a dot corresponding to the dot DP1. The dot DF1 is located at one of the vertexes provided to the image object OF1. The dot DF2 is a dot corresponding to the dot DP2. The dot DF2 is located at one of the vertexes provided to the image object OF2. The dot DF3 is a dot corresponding to the dot DP3. The dot DF3 is located at one of the vertexes provided to the image object OF3. The dot DF4 is a dot corresponding to the dot DP4. The dot DF4 is located at one of the vertexes provided to the image object OF4. The dot DF5 is a dot corresponding to the dot DP5. The dot DF5 is located at the upper left vertex out of the vertexes of the image GF1 doted by the image GF12. The dot DF6 is a dot corresponding to the dot DP6. The dot DF6 is located at the lower right vertex out of the vertexes of the image GF1 doted by the image GF12.

In the present embodiment, the size setting information 101 includes information designating that the numerical value to be displayed by the projector 1 on the projection surface is based on the first size information 112. In other words, the size setting information 101 includes information representing coordinates of two dots which correspond one-to-one to the dot DP5 and the dot DP6 to be a reference of the distance between the dot DP5 and the dot DP6 to be the display target, and which are included in the image represented by the projection image information 105. Specifically, the size setting information 101 includes information representing the coordinate of the dot DF5 corresponding to the dot DP5 and the coordinate of the dot DF6 corresponding to the dot DP6.

In the image GF1, the upper left vertex of the image is defined as an origin, a direction which is parallel to the longitudinal direction of the image GF1, and rightward from the origin when facing to the image is defined as a J direction, and a direction which is parallel to a short-side direction of the image GF1, and downward from the origin when facing to the image is defined as a K direction. Further, an axis extending from the origin toward the J direction is defined as a J axis, and an axis extending from the origin toward the K direction is defined as a K axis. Further, the coordinate of a dot in the image GF1 is expressed as (j,k). Here, the value j represents a J coordinate of the dot in the image GF1. Further, the value k represents a K coordinate of the dot in the image GF1.

Figure 6:
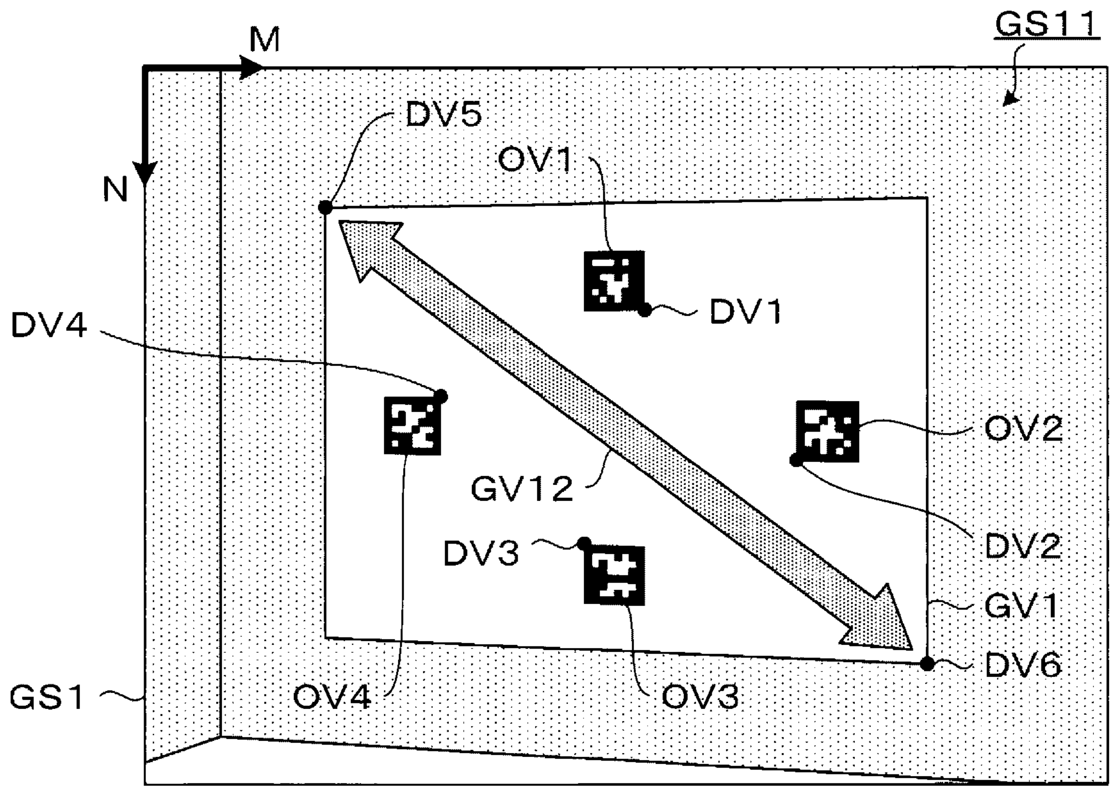
FIG. 6 is a schematic diagram illustrating an example of an image represented by taken image information 102.

FIG. 6 is a schematic diagram illustrating an example of an image represented by the taken image information 102. In the present embodiment, the taken image information 102 represents a result obtained by taking the projection image GP displayed on the wall surface W1. The taken image information 102 represents, for example, a taken image GS1. The taken image GS1 includes an image GS11. The image GS11 is an image showing the wall surface W1. The image GS11 includes an image GV1. The image GV1 is an image showing the projection image GP1.

The image GV1 includes an image object OV1, an image object OV2, an image object OV3, and an image object OV4. The image object OV1 corresponds to the image object OP1. In other words, the image object OV1 corresponds to the image object OF1. The image object OV2 corresponds to the image object OP2. In other words, the image object OV2 corresponds to the image object OF2. The image object OV3 corresponds to the image object OP3. In other words, the image object OV3 corresponds to the image object OF3. The image object OV4 corresponds to the image object OP4. In other words, the image object OV4 corresponds to the image object OF4. The image objects OV1 through OV4 are each an image having a geometric pattern. Further, the image objects OV1 through OV4 each have a plurality of vertexes.

Further, the image GV1 includes an image GV12. The image GV12 is an image corresponding to the image GP12. In other words, the image GV12 is an image corresponding to the image GF12. The image GV12 is an image which has arrow shapes at both ends, and a longitudinal direction of which extends along one of two diagonal lines provided to the image GV1. The image GV12 dots an upper left vertex and a lower right vertex out of the plurality of vertexes provided to the image GV1. Further, the image GV12 has a plurality of vertexes.

Further, the image GV1 includes a dot DV1, a dot DV2, a dot DV3, a dot DV4, a dot DV5, and a dot DV6. The dot DV1 is a dot corresponding to the dot DP1. In other words, the dot DV1 is a dot corresponding to the dot DF1. The dot DV1 is located at one of the vertexes provided to the image object OV1. The dot DV2 is a dot corresponding to the dot DP2. In other words, the dot DV2 is a dot corresponding to the dot DF2. The dot DV2 is located at one of the vertexes provided to the image object OV2. The dot DV3 is a dot corresponding to the dot DP3. In other words, the dot DV3 is a dot corresponding to the dot DF3. The dot DV3 is located at one of the vertexes provided to the image object OV3. The dot DV4 is a dot corresponding to the dot DP4. In other words, the dot DV4 is a dot corresponding to the dot DF4. The dot DV4 is located at one of the vertexes provided to the image object OV4. Therefore, the dots DV1 through DV4 correspond one-to-one to the dots DF1 through DF4.

The dot DV5 is a dot corresponding to the dot DP5. In other words, the dot DV5 is a dot corresponding to the dot DF5. The dot DV5 is located at the upper left vertex out of the vertexes of the image GV1 doted by the image GV12. The dot DV6 is a dot corresponding to the dot DP6. In other words, the dot DV6 is a dot corresponding to the dot DF6. The dot DV6 is located at the lower right vertex out of the vertexes of the image GV1 doted by the image GV12.

In the image GS1, the upper left vertex of the image is defined as an origin, a direction which is parallel to the longitudinal direction of the image GS1, and rightward from the origin when facing to the image is defined as an M direction, and a direction which is parallel to a short-side direction of the image GS1, and downward from the origin when facing to the image is defined as an N direction. Further, an axis extending from the origin toward the M direction is defined as an M axis, and an axis extending from the origin toward the N direction is defined as an N axis. Further, the coordinate of a dot in the taken image GS1 is expressed as (m,n). Here, the value m represents an M coordinate of the dot in the taken image GS1. Further, the value n represents an N coordinate of the dot in the taken image GS1.

Going back to FIG. 3, the processing device 12 is configured including a single CPU or a plurality of CPUs. It should be noted that the processing device 12 can be a device provided with a programmable logic device such as an FPGA instead of, or in addition to the CPU. Here, CPU is an abbreviation for Central Processing Unit, and FPGA is an abbreviation for Field-Programmable Gate Array.

The processing device 12 functions as the acquisition unit 120, the projection controller 121, the input manager 122, the detector 123, the size information generator 124, and the image generator 125 shown in FIG. 3 by the CPU and so on provided to the processing device 12 executing the program 100.

The acquisition unit 120 controls the communication device 22 to thereby obtain a variety of types of information from the terminal device, the external storage device, the external server, or the like coupled to the projector 1 so as to communicate with each other. Further, the acquisition unit 120 makes the storage device 10 store the variety of types of information thus obtained. In the present embodiment, the acquisition unit 120 obtains the first projection image information 106 and the first coordinate information 109 from the external server coupled to the projector 1 so as to communicate with each other. Further, the acquisition unit 120 makes the storage device 10 store the first projection image information 106 and the first coordinate information 109 thus obtained. Further, the acquisition unit 120 obtains the taken image information 102 output from the imaging element 142 provided to the camera 14. Further, the acquisition unit 120 makes the storage device 10 store the taken image information 102 thus obtained.

The projection controller 121 controls the projection mechanism 16 to thereby project the projection light for displaying the projection image GP to the projection surface. In the present embodiment, the projection controller 121 controls the projection mechanism 16 to thereby project the projection light for displaying the projection image GP to the wall surface W1. Specifically, the projection controller 121 makes the projection mechanism 16 project the projection light based on the projection image information 105 to thereby display the projection image GP on the wall surface W1. More specifically, the projection controller 121 makes the projection mechanism 16 project the projection light based on the first projection image information 106 to thereby display the projection image GP1 on the wall surface W1. Further, the projection controller 121 makes the projection mechanism 16 project the projection light based on the second projection image information 107 to thereby display the projection image GP2 on the wall surface W1.

The input manager 122 controls the operation device 20 to thereby obtain the operation data representing the content of the operation received from the user. Further, the input manager 122 generates a variety of types of information based on the operation data thus obtained.

In the present embodiment, the input manager 122 obtains the operation data representing the content of the operation for performing the setting related to the display of the size related to the projection image GP displayed on the projection surface. Further, the input manager 122 generates the size setting information 101 based on that operation data. Further, the input manager 122 makes the storage device 10 store the size setting information 101 thus generated. It should be noted that an operation of performing the setting related to display of the size related to the projection image GP displayed on the projection surface is hereinafter referred to as a "size setting operation" in some cases.

The detector 123 executes the image processing on the image represented by the variety of types of image information to thereby detect a dot included in that image. In other words, the detector 123 obtains the coordinate information 108 representing the coordinate of the dot thus detected. Further, the detector 123 makes the storage device 10 store the coordinate information 108 thus obtained.

In the present embodiment, the detector 123 executes the image processing on the image represented by the taken image information 102 to thereby detect a plurality of dots included in the image represented by the taken image information 102. In other words, the detector 123 obtains the second coordinate information 110 representing coordinates of the plurality of dots included in the image represented by the taken image information 102. Further, the detector 123 makes the storage device 10 store the second coordinate information 110 thus obtained. Specifically, the detector 123 executes the image processing on the taken image GS1 to thereby detect a plurality of dots including the dots DV1 through DV4 as the plurality of dots included in the taken image GS1. The second coordinate information 110 represents the coordinates of the plurality of dots included in the taken image GS1. In other words, the second coordinate information 110 represents the coordinates of the plurality of dots including the dots DV1 through DV4.

It is possible for the detector 123 to execute the image processing on the image represented by the projection image information 105 to thereby detect a plurality of dots included in the image represented by the projection image information 105. When the detector 123 has detected the plurality of dots included in the image represented by the projection image information 105, the detector 123 obtains the first coordinate information 109 which represents the coordinates of the plurality of dots included in the image represented by the projection image information 105. Further, the detector 123 makes the storage device 10 store the first coordinate information 109 thus obtained. It should be noted that in the present embodiment, the first coordinate information 109 represents the coordinates of the plurality of dots included in the image represented by the first projection image information 106. Specifically, the first coordinate information 109 represents the coordinates of the plurality of dots included in the image GF1. More specifically, the first coordinate information 109 represents the coordinates of the plurality of dots including the dots DF1 through DF4.

In the function related to the detection of the dots, there can be used an image processing technology known to the public. As the image processing technology known to the public related to the detection of the dots, there can be cited, for example, template matching and an algorithm called "AKAZE." In the present specification, a detailed technical description related to the detection of the dots will be omitted.

The size information generator 124 generates the projection size information 111 based on information output from a sensor. In the present embodiment, the size information generator 124 generates the projection size information 111 based on the taken image information 102 output from the imaging element 142, the position information 104, and the projection image information 105.

Specifically, the size information generator 124 generates the calculation parameter 103 based on the second coordinate information 110 representing the coordinate of the dot included in the image represented by the taken image information 102, the position information 104, the first coordinate information 109 representing the coordinate of the dot included in the image represented by the projection image information 105, and the internal parameter 114. More specifically, the size information generator 124 generates the calculation parameter 103 based on the second coordinate information 110 representing the coordinate of the dot included in the taken image GS1, the position information 104, the first coordinate information 109 representing the coordinate of the dot included in the image GF1, and the internal parameter 114. Further, the size information generator 124 generates the projection size information 111 based on the size setting information 101, the calculation parameter 103, and the internal parameter 114. In the present embodiment, the size information generator 124 generates the first size information 112 based on the size setting information 101, the calculation parameter 103, and the internal parameter 114.

The projection parameter 115 included in the internal parameter 114 includes information representing a focal distance of the projection mechanism 16, and information representing the coordinate of a dot at which the center of a projection lens provided to the projection mechanism 16 overlaps the image GF1 in the JK coordinate system, in other words, the dot at which the image GF1 and the optical axis of the projection lens provided to the projection mechanism 16 virtually cross each other. Further, the camera parameter 116 included in the internal parameter 116 includes information representing a focal distance of the imaging lens 140, and information representing the coordinate of a dot at which the center of the imaging lens 140 overlaps the taken image GS1 in the MN coordinate system, in other words, the dot at which the taken image GS1 and the optical axis of the imaging lens 140 virtually cross each other.

A variety of variables represented by the calculation parameter 103 are derived from a projective transformation matrix generated based on at least four correspondence relationships between the coordinates of a plurality of dots represented by the first coordinate information 109 normalized based on the projection parameter 115 and the coordinates of a plurality of dots represented by the second coordinate information 110 normalized based on the camera parameter 116. Specifically, the calculation parameter 103 includes information representing a value a, a value b, and a value c when defining an equation representing the projection surface as $ax+by+cz=1$ in the XYZ coordinate system. Further, the calculation parameter 103 includes information representing a vector T representing a relative position of the camera 14 to the projection mechanism 16 in the XYZ coordinate system. Further, the calculation parameter 103 includes information representing a rotation matrix R representing a posture of the camera 14 with respect to the projection mechanism 16. Further, the calculation parameter 103 includes information representing a value s representing a ratio between a magnitude of the vector T' represented by the position information 104 and a magnitude of the vector T.

When the value a, the value b, and the value c represented by the calculation parameter 103 are figured out, a coordinate of a dot included in the projection image GP in the XYZ coordinate system is calculated from a correspondence relationship between a dot included in the image represented by the projection image information 105 and a dot included in the projection image GP. Further, the size related to the projection image GP is calculated based on the coordinates of the plurality of dots included in the projection image GP in the XYZ coordinate system and the value s. In the present embodiment, the coordinate of the dot DP5 and the coordinate of the dot DP6 are calculated based on the coordinate of the dot DF5 and the coordinate of the dot DF6 represented by the size setting information 101 normalized based on the projection parameter 115, and the value a, the value b, and the value c represented by the calculation parameter 103. Further, the distance between the dot DP5 and the dot DP6 is calculated based on the coordinate of the dot DP5 and the coordinate of the dot DP6, and the value s represented by the calculation parameter 103. In other words, the first size information 112 representing the distance between the dot DP5 and the dot DP6 is generated based on the size setting information 101, the calculation parameter 103, and the internal parameter 114.

It should be noted that when the size setting information 101 includes information of designating that a numerical value to be displayed by the projector 1 on the projection surface is based on the second size information 113, for example, the area of the projection image GP is calculated based on the coordinates of the plurality of vertexes provided to the projection image GP and the value s. Further, the area of the image included in the projection image GP is calculated based on the ratio between the area of the projection image GP and the area represented by the size setting information 101. In other words, the second size information 113 representing the area of the image included in the projection image GP is generated based on the size setting information 101, the calculation parameter 103, and the internal parameter 114.

The image generator 125 generates the second projection image information 107 based on the first projection image information 106 and the projection size information 111.

Figure 7:
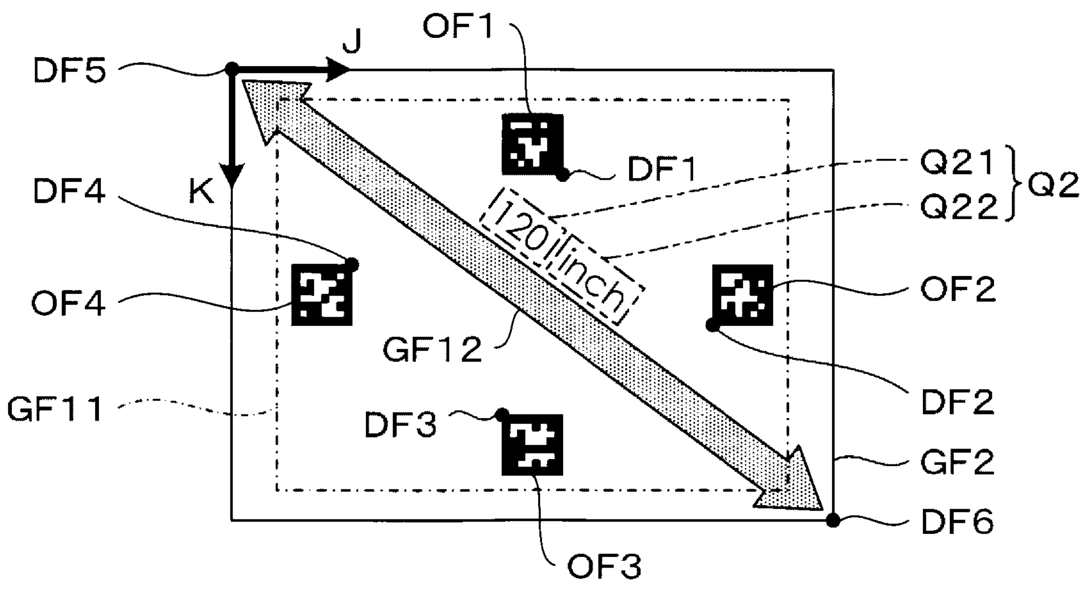
FIG. 7 is a schematic diagram illustrating an example of an image represented by second projection image information 107.

FIG. 7 is a schematic diagram illustrating an example of an image represented by the second projection image information 107. The second projection image information 107 represents the image which includes the image representing the size related to the projection image GP. In other words, the second projection image information 107 represents the image which includes the image showing the numerical value represented by the projection size information 111. In the present embodiment, the second projection image information 107 represents an image GF2. The projector 1 makes the projection mechanism 16 project the projection light based on the second projection image information 107 to thereby display the projection image GP2 on the wall surface W1.

The image GF2 is an image corresponding to the projection image GP2. The image GF2 is an image obtained by superimposing a character string Q2 on the image GF1. In other words, a variety of dimensions of the image GF2 coincide with those of the image GF1.

The character string Q2 corresponds to the character string Q1. The character string Q2 includes a number Q21 and a character string Q22.

The number Q21 corresponds to the number Q11. The number Q21 is an image showing the numerical value represented by the first size information 112. Specifically, the number Q21 is an image including a number of "120" for representing the length of the diagonal line of the projection image GP1 and the projection image GP2 in inches.

The character string Q22 corresponds to the character string Q12. The character string Q22 is a character string representing the unit of the numerical value represented by the first size information 112. Specifically, the character string Q22 is a character string of "inch" which represents that the length of the diagonal line of the projection image GP1 and the projection image GP2 is displayed in inches.

It should be noted that generating the second projection image information 107 based on the first projection image information 106 and the projection size information 111 is hereinafter referred to as "updating the projection image information" in some cases.

The camera 14 is provided with the imaging lens 140 for converging light, and the imaging element 142 for converting the light thus converged into an electrical signal. The imaging element 142 is, for example, an image sensor such as a CCD sensor or a CMOS sensor. Here, CCD is an abbreviation for Charge Coupled Device, and CMOS is an abbreviation for Complementary Metal Oxide Semiconductor. The camera 14 takes an image of the imaging area E1 on the wall surface W1 on which the projection image GP is displayed. The imaging element 142 outputs the taken image information 102 representing the result obtained by imaging the imaging area E1 on the wall surface W1 on which the projection image GP is displayed to the processing device 12. In the present embodiment, the camera 14 is disposed in the chassis 18.

The projection mechanism 16 is configured including a light source, a light modulator for forming the projection light based on a signal input from the processing device 12, and a projection optical system for projecting the projection light on the projection surface. The light source includes, for example, a halogen lamp, a xenon lamp, a super-high pressure mercury lamp, an LED, or a laser source. The light modulator includes, for example, a DMD or a liquid crystal panel. The projection optical system includes a projection lens group having a plurality of lenses. Here, LED is an abbreviation for Light Emitting Diode, and DMD is an abbreviation for Digital Mirror Device. The projection mechanism 16 projects the projection light for displaying the projection image GP on the projection surface under the control of the projection controller 121. In the present embodiment, the projection mechanism 16 projects the projection light for displaying the projection image GP on the wall surface W1. Specifically, the projection mechanism 16 projects the image GF1 on the wall surface W1 to thereby display the projection image GP1. Further, the projection mechanism 16 projects the image GF2 on the wall surface W1 to thereby display the projection image GP2. Further, the projection mechanism 16 is disposed in the chassis 18.

The operation device 20 receives an input operation to the projector 1 from the user of the projector 1. The operation device 20 is configured including, for example, a touch panel or operation buttons provided to the chassis 18. When the operation device 20 is configured including the touch panel, the operation device 20 outputs data representing a touch position detected to the processing device 12. Further, when the operation device 20 is configured including the operation buttons, the operation device 20 outputs data for identifying the button which is held down to the processing device 12. Thus, the content of the input operation to the projector 1 is transmitted to the processing device 12. In the present embodiment, the operation device 20 receives a size setting operation from the user. Further, the operation device 20 outputs operation data representing the content of the size setting operation to the processing device 12.

The communication device 22 includes, for example, an interface board having a connector and an interface circuit, and has a function of receiving a variety of types of information from the terminal device, the external storage device, and the external server, and a function of transmitting a variety of types of information to the terminal device, the external storage device, and the external server. The communication device 22 can transmit/receive a variety of types of information using wired communication, or can also transmit/receive them using wireless communication. When the wireless communication is used, the communication device 22 is configured including an antenna compatible with the wireless communication compliant with a predetermined communication standard. In the present embodiment, the communication device 22 is coupled to the external server not shown so as to communicate with each other, and transmits/receives a variety of types of information to/from the external server.

1.3. Operation of Projector

Figure 8:
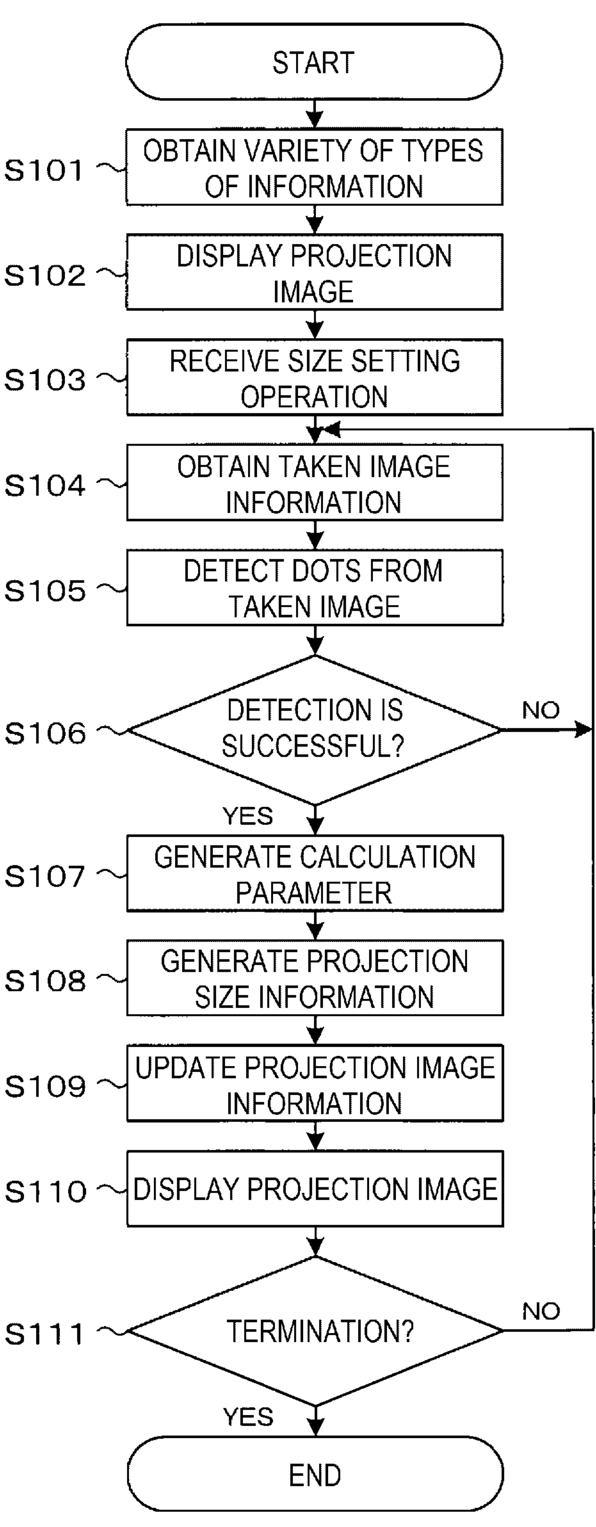
FIG. 8 is a flowchart for explaining an operation of the projector 1 according to the first embodiment.

FIG. 8 is a flowchart for explaining an operation of the projector 1 according to the first embodiment. A series of actions shown in the flowchart is started when, for example, the power of the projector 1 is turned ON, and the operation device 20 receives the input operation related to a start of the operation from the user of the projector 1.

In the step S101, the acquisition unit 120 controls the communication device 22 to thereby obtain a variety of types of information from the external server coupled to the projector 1 so as to communicate with each other. Specifically, the acquisition unit 120 obtains the first projection image information 106 and the first coordinate information 109 from that external server. Further, the acquisition unit 120 makes the storage device 10 store the first projection image information 106 and the first coordinate information 109 thus obtained.

In the step S102, the projection controller 121 controls the projection mechanism 16 to thereby project the projection light for displaying the projection image GP1 to the wall surface W1. In other words, the projection controller 121 makes the projection mechanism 16 project the projection light based on the first projection image information 106 to thereby display the projection image GP1 on the wall surface W1.

The operation device 20 receives the size setting operation from the user of the projector 1. Further, the operation device 20 outputs operation data representing the content of the size setting operation to the processing device 12. In the step S103, the input manager 122 obtains the operation data representing the content of the size setting operation received from the user. Further, the input manager 122 generates the size setting information 101 based on that operation data. Further, the input manager 122 makes the storage device 10 store the size setting information 101 thus generated.

In the step S104, the acquisition unit 120 obtains the taken image information 102 output from the imaging element 142. Further, the acquisition unit 120 makes the storage device 10 store the taken image information 102 thus obtained.

In the step S105, the detector 123 executes the image processing on the image represented by the taken image information 102 to thereby detect the plurality of dots included in the image represented by the taken image information 102. Specifically, the detector 123 executes the image processing on the taken image GS1 represented by the taken image information 102 to thereby detect the plurality of dots included in the taken image GS1. In other words, the detector 123 obtains the second coordinate information 110 representing the coordinates of the plurality of dots included in the image represented by the taken image information 102.

In the step S106, the detector 123 determines whether or not detection of the plurality of dots included in the image represented by the taken image information 102 is successful. Specifically, the detector 123 determines whether or not detection of the plurality of dots included in the taken image GS1 is successful. When the detection of the plurality of dots included in the image represented by the taken image information 102 is successful, namely YES is determined in the step S106, the detector 123 proceeds with the process to the step S107. Further, when the detection of the plurality of dots included in the image represented by the taken image information 102 is unsuccessful, namely NO is determined in the step S106, the detector 123 proceeds with the process to the step S104.

For example, it is possible for the detector 123 to compare the number of coordinates represented by the first coordinate information 109 and the number of coordinates represented by the second coordinate information 110 with each other. When the number of the coordinates represented by the first coordinate information 109 and the number of the coordinates represented by the second coordinate information 110 coincide with each other, it is possible for the detector 123 to determine that the detection of the plurality of dots included in the image represented by the taken image information 102 is successful.

Further, the image represented by the taken image information 102 blurs in some cases due to, for example, an unintended vibration caused at the timing when the camera 14 takes the projection image GP displayed on the wall surface W1. In such a case, it is unachievable in some cases for the detector 123 to detect the plurality of dots included in the image represented by the taken image information 102. In other words, when the plurality of dots included in the image represented by the taken image information 102 is not detected, the detector 123 can determine that the detection of the plurality of dots included in the image represented by the taken image information 102 is unsuccessful.

When it is determined that the detection of the plurality of dots included in the image represented by the taken image information 102 is unsuccessful, the processing device 12 obtains the taken image information 102 once again in the step S104. Further, in the step S105, the processing device 12 executes the image processing on the image represented by the taken image information 102 to thereby detect the plurality of dots included in the image represented by the taken image information 102 once again.

In the step S107, the size information generator 124 generates the calculation parameter 103 based on the second coordinate information 110, the position information 104, the first coordinate information 109, and the internal parameter 114.

In the step S108, the size information generator 124 generates the projection size information 111 based on the size setting information 101, the calculation parameter 103, and the internal parameter 114. In the present embodiment, the size information generator 124 generates the first size information 112 based on the size setting information 101, the calculation parameter 103, and the internal parameter 114.

In the step S109, the image generator 125 updates the projection image information. In other words, the image generator 125 generates the second projection image information 107 based on the first projection image information 106 and the projection size information 111.

In the step S110, the projection controller 121 controls the projection mechanism 16 to thereby project the projection light for displaying the projection image GP to the wall surface W1. In other words, the projection controller 121 makes the projection mechanism 16 project the projection light based on the second projection image information 107 to thereby display the projection image GP on the wall surface W1. Specifically, the projection controller 121 makes the projection mechanism 16 project the projection light based on the second projection image information 107 to thereby display the projection image GP2 on the wall surface W1.

In the step S111, the input manager 122 determines whether or not an operation related to a termination of the operation is received from the user based on the operation data. When the operation related to the termination of the operation is received from the user, namely YES is determined in the step S111, the processing device 12 provided with the input manager 122 terminates the series of the actions shown in the flowchart of FIG. 8. Further, when the operation related to the termination of the operation is not received from the user, namely NO is determined in the step S111, the input manager 122 proceeds with the process to the step S104.

As described above, according to the first embodiment, the projector 1 displays the size related to the projection image GP displayed on the projection surface. In other words, it is possible for the user to easily figure out the size related to the projection image GP displayed on the projection surface.

Further, according to the first embodiment, the projector 1 displays the image having a plurality of vertexes such as the image GP11 and the image GP12. In other words, the image represented by the taken image information 102 includes an image having a plurality of vertexes such as the image objects OV1 through OV4 and the image GV12.

When detecting a dot from the image using image processing, in general, it is preferable for the dot the position of which can accurately be determined to be included in the image. Specifically, it is preferable that the dot in which an amount of change in luminance value or the like between pixels adjacent to each other is high in both of a vertical direction of the image and a horizontal direction of the image is included in the image. As the place where an amount of change in luminance value or the like between the pixels adjacent to each other is high in both of the vertical direction of the image and the horizontal direction of the image, there can be cited, for example, a corner-like portion included in the image. Since the plurality of vertexes, namely a plurality of corner-like portions, is included in the image represented by the taken image information 102, it is possible for the projector 1 to accurately detect the dot from the image represented by the taken image information 102.

As described hereinabove, the projection method according to the first embodiment includes generating projection size information 111 including at least one of the first size information 112 representing the distance between the two dots included in the projection image GP1 displayed on the wall surface W1, and the second size information 113 representing the area of the first image included in the projection image GP1 based on the taken image information 102 output from the imaging element 142, and displaying the projection image GP2 including the number Q11 showing the numerical value represented by the projection size information 111 on the wall surface W1.

Further, the projector 1 according to the first embodiment is provided with the processing device 12, the imaging element 142, the projection mechanism 16, the processing device 12 executes generating projection size information 111 including at least one of the first size information 112 representing the distance between the two dots included in the projection image GP1 displayed on the wall surface W1, and the second size information 113 representing the area of the first image included in the projection image GP1 based on the taken image information 102 output from the imaging element 142, and controlling the projection mechanism 16 to thereby display the projection image GP2 including the number Q1 showing the numerical value represented by the projection size information 111 on the wall surface W1.

In other words, the projector 1 displays the number Q11 representing the size related to the projection image GP1 displayed on the wall surface W1 to be the projection surface on the wall surface W1. Thus, it is possible for the user to easily figure out the size related to the projection image GP1 displayed on the wall surface W1. Therefore, it is possible for the user to easily adjust the size related to the projection images GP into a desired size by changing the position of the projector 1 while confirming the number Q11 displayed on the wall surface W1.

It should be noted that, in the first embodiment, the projector 1 is an example of a "projection system," the imaging element 142 is an example of a "sensor," the taken image information 102 is an example of "information," the wall surface W1 is an example of a "projection surface," the projection image GP1 is an example of a "first projection image," the first size information 112 is an example of "first size information," the second size information 113 is an example of "second size information," the projection size information 111 is an example of "projection size information," the number Q11 is an example of an "image showing a numerical value represented by the projection size information," the projection image GP2 is an example of a "second projection image," the processing device 12 is an example of a "processing device," and the projection mechanism 16 is an example of a "projection mechanism." Further, the distance between the dot DP5 and the dot DP6 is an example of a "distance between two dots." Further, the image GP11 and the image GP12 are each an example of the "first image."

Further, in the projection method according to the first embodiment, the projection size information 111 includes the first size information 112, the first size information 112 represents the length of the diagonal line of the projection image GP1, and the projection image GP2 includes the character string Q12 representing that the numerical value represented by the projection size information 111 is displayed in inches.

For example, the size of the image display area in a display device such as a television system is compared based on the length of the diagonal line. In other words, by the length of the diagonal line being displayed, it is possible for the user to easily compare the size of the projection image GP and the size of the display device with each other. Further, the length of the diagonal line of the display device is generally displayed in an inch size. In other words, by the user being notified of the fact that the unit used when comparing the size of the image display area of the display device and the unit representing the size of the projection image GP coincide with each other, it is possible for the user to more easily compare the size of the projection image GP and the size of the display device with each other.

It should be noted that in the first embodiment, the inch is an example of a "first unit," and the character string Q12 is an example of a "character string."

Further, in the projection method according to the first embodiment, the projection image GP1 is displayed by the projection mechanism 16 projecting the image GF1 on the wall surface W1, the imaging element 142 is an image sensor provided to the camera 14 for taking the projection image GP1, and generating the projection size information 111 includes obtaining the taken image information 102 output from the imaging element 142 by taking the projection image GP1, and generating the projection size information 111 based on the position information 104 representing the positional relationship between the camera 14 and the projection mechanism 16, the first projection image information 106 representing the image GF1, and the taken image information 102.

In other words, it is possible for the projector 1 to calculate the size related to the projection image GP1 without using a special device such as a ToF sensor. Thus, it is possible for the projector 1 to display the image representing the size related to the projection image GP at lower cost compared to when using the special device such as a ToF sensor. Here, ToF is an abbreviation for Time of Flight.

It should be noted that in the first embodiment, the image GF1 is an example of a "second image," the camera 14 is an example of a "camera," the position information 104 is an example of "position information," and the first projection image information 106 is an example of "second image information."

Further, in the projection method according to the first embodiment, the camera 14 and the projection mechanism 16 are disposed in the chassis 18, and the chassis 18 is provided with the storage device 10 for storing the position information 104.

In other words, the position information 104 is information inherent in the device, and is constant. Further, the position information 104 is figured out in advance. Thus, it is possible for the user to omit the operation of obtaining the position information 104 which becomes necessary when calculating the size related to the projection image GP.

It should be noted that in the first embodiment, the chassis 18 is an example a "chassis," and the storage device 10 is an example of a "storage device."

Further, in the projection method according to the first embodiment, generating the projection size information 111 includes obtaining the first coordinate information 109 representing the coordinates of the dots DF1 through DF4 included in the image GF1, and obtaining the second coordinate information 110 representing the coordinates of the dots DV1 through DV4 which are included in the taken image GS1 represented by the taken image information 102, and which correspond one-to-one to the dots DF1 through DF4, and generating the projection size information 111 based on the position information 104, the first projection image information 106, and the taken image information 102 includes generating the projection size information 111 based on the position information 104, the first coordinate information 109, and the second coordinate information 110.

In other words, the projector 1 calculates the size related to the projection image GP based on the correspondence relationship between the plurality of dots included in the image GF1 and the plurality of dots included in the taken image GS1. Thus, it is possible for the projector 1 to accurately calculate the size related to the projection image GP.

It should be noted that in the first embodiment, the dots DF1 through DF4 are an example of a "plurality of first dots," the first coordinate information 109 is an example of "first coordinate information," the taken image GS1 is an example of a "taken image," the dots DV1 through DV4 are an example of a "plurality of second dots," and the second coordinate information 110 is an example of "second coordinate information."

Further, in the projection method according to the first embodiment, the image GF1 includes a third image having a plurality of vertexes.

In other words, the projector 1 projects the image GF1 to thereby display the image having a plurality of vertexes such as the image GP11 and the image GP12 on the wall surface W1. Thus, the taken image GS1 includes an image having a plurality of vertexes high in detection accuracy in the image processing such as the image objects OV1 through OV4 and the image GV12. Therefore, it is possible for the projector 1 to accurately detect the dots located at the plurality of vertexes included in the taken image GS1. As a result, it is possible for the projector 1 to more accurately calculate the size related to the projection image GP.

It should be noted that in the first embodiment, the image GP11 and the image GP12 are each an example of the "third image."

2. Modified Examples

The embodiment described hereinabove can variously be modified. Specific aspects of modifications will hereinafter be illustrated. Further, two or more aspects arbitrarily selected from the following illustrations can arbitrarily be combined unless conflicting with each other. It should be noted that in each of the modified examples hereinafter illustrated, regarding the elements substantially the same in operation and function as those in the embodiment described above, the symbols used in the above description are diverted to arbitrarily omit the detailed description of each of such elements.

2.1. Modified Example 1

In the embodiment described above, there is illustrated when a single set of character strings representing the size related to the projection image GP are displayed, but the present disclosure is not limited to such an aspect. Two or more sets of the character strings representing the size related to the projection image GP can be displayed at the same time. For example, the character string including a number showing a numerical value represented by the first size information 112 and the character string including a number showing a numerical value represented by the second size information 113 can be displayed at the same time.

Figure 9:
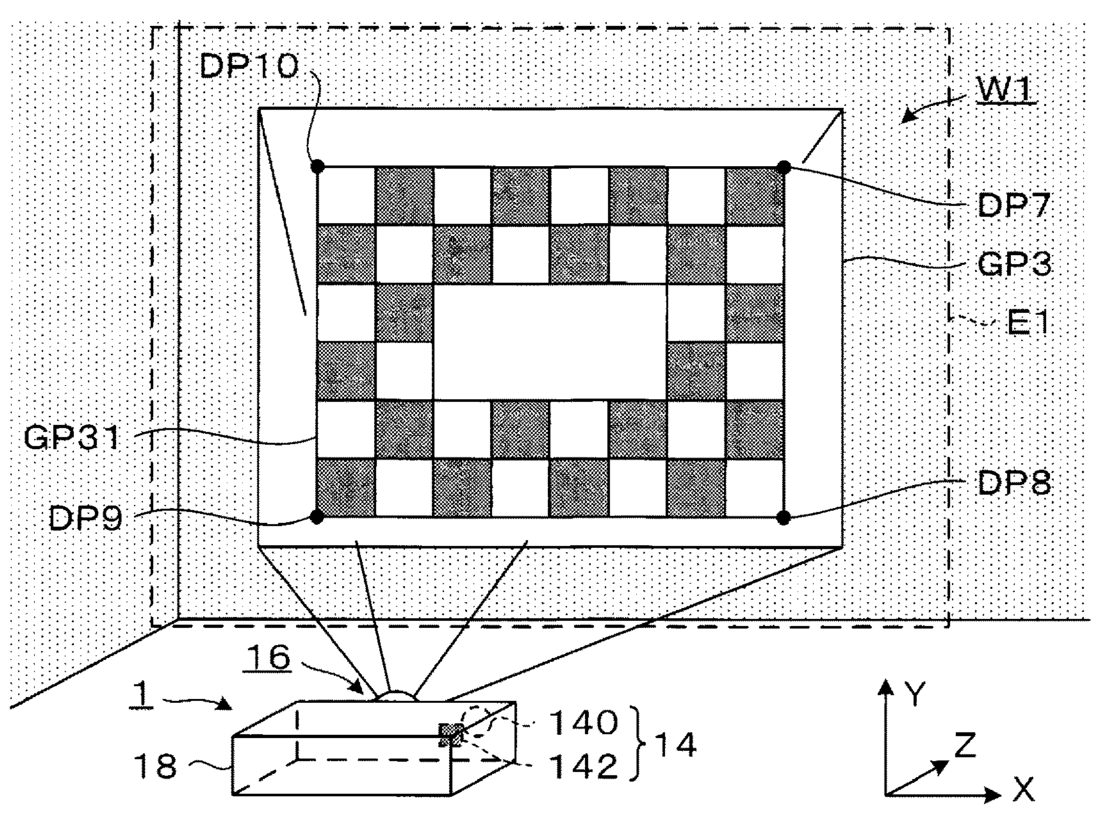
FIG. 9 is a schematic diagram illustrating a state in which a projection image GP3 is displayed.
Figure 10:
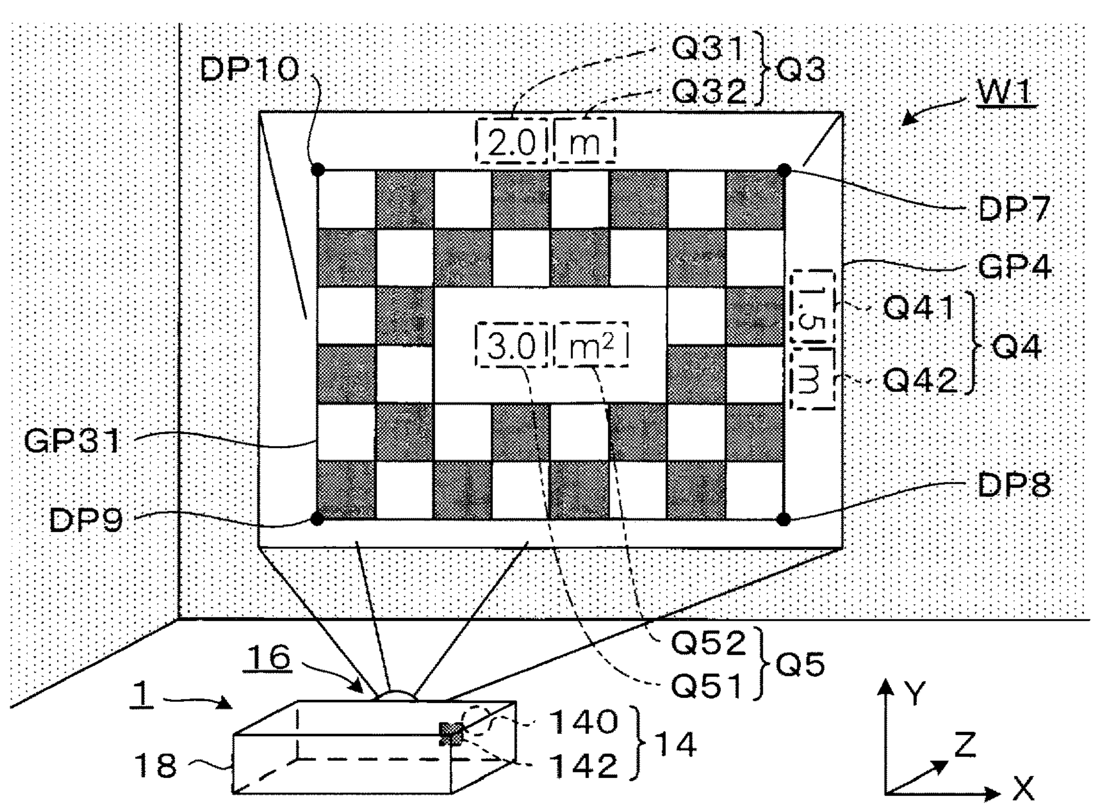
FIG. 10 is a schematic diagram illustrating a state in which a projection image GP4 is displayed.

FIG. 9 is a schematic diagram illustrating a state in which a projection image GP3 is displayed. FIG. 10 is a schematic diagram illustrating a state in which a projection image GP4 is displayed.

The projector 1 controls the projection mechanism 16 to thereby display the projection image GP3 on the wall surface W1.

The projection image GP3 includes an image GP31. The image GP31 includes an area having a pattern in which a plurality of black squares and a plurality of white squares are alternately arranged, and a plain area located near the center of the image.

Further, the projection image GP3 includes a dot DP7, a dot DP8, a dot DP9, and a dot DP10. The dot DP7 is located at an upper right vertex viewed from the user out of the vertexes provided to the image GP31. The dot DP8 is located at a lower right vertex viewed from the user out of the vertexes provided to the image GP31. The dot DP9 is located at a lower left vertex viewed from the user out of the vertexes provided to the image GP31. The dot DP10 is located at an upper left vertex viewed from the user out of the vertexes provided to the image GP31.

The camera 14 images the imaging area E1 including the projection image GP3 to thereby obtain the taken image. The projector 1 calculates the size related to the projection image GP3 displayed on the wall surface W1 based on the taken image obtained by the camera 14. In the present embodiment, the projector 1 calculates the distance between the dot DP7 and the dot DP8 as the size related to the projection image GP3. Further, the projector 1 calculates the distance between the dot DP7 and the dot DP10 as the size related to the projection image GP3. Further, the projector 1 calculates the area of the image GP31 as the size related to the projection image GP3.

When the distance between the dot DP7 and the dot DP8, the distance between the dot DP7 and the dot DP10, and the area of the image GP31 are calculated as the size related to the projection image GP3, the projector 1 controls the projection mechanism 16 to thereby display the projection image GP4 on the wall surface W1.

The projection image GP4 is an image obtained by superimposing a character string Q3, a character string Q4, and a character string Q5 on the projection image GP3. The variety of dimensions of the projection image GP4 coincide with those of the projection image GP3.

The character string Q3 includes a number Q31 and a character string Q32. The number Q31 is an image representing the size related to the projection image GP3. Specifically, the number Q31 is an image including a number of "2.0" representing the distance between the dot DP7 and the dot DP10. More specifically, the number Q31 is an image including a number displaying the distance between the dot DP7 and the dot DP10 in meters. The character string Q32 is a character string representing the unit of the size related to the projection image GP3. Specifically, the character string Q32 is a character string of "m" which represents that the distance between the dot DP7 and the dot DP10 is displayed in meters.

The character string Q4 includes a number Q41 and a character string Q42. The number Q41 is an image representing the size related to the projection image GP3. Specifically, the number Q41 is an image including a number of "1.5" representing the distance between the dot DP7 and the dot DP8. More specifically, the number Q41 is an image including a number displaying the distance between the dot DP7 and the dot DP8 in meters. The character string Q42 is a character string representing the unit of the size related to the projection image GP3. Specifically, the character string Q42 is a character string of "m" which represents that the distance between the dot DP7 and the dot DP8 is displayed in meters.

The character string Q5 includes a number Q51 and a character string Q52. The number Q51 is an image representing the size related to the projection image GP3. Specifically, the number Q51 is an image including a number of "3.0" representing the area of the image GP31. More specifically, the number Q51 is an image including a number displaying the area of the image GP31 in square meters. The character string Q52 is a character string representing the unit of the size related to the projection image GP3. Specifically, the character string Q52 is a character string of "$m^2$" which represents that the area of the image GP31 is displayed in square meters.

It is possible for the user to figure out the distance between the dot DP7 and the dot DP10 is 2.0 meter by checking the character string Q3. Further, it is possible for the user to figure out the distance between the dot DP7 and the dot DP8 is 1.5 meter by checking the character string Q4. Further, it is possible for the user to figure out the area of the image GP31 is 3.0 square meters by checking the character string Q5. Further, it is possible for the user to easily adjust the size of the projection image GP into a desired size by changing the arrangement of the projector 1 while confirming the number representing the size related to the projection image GP displayed on the wall surface W1.

It should be noted that the character string representing the size related to the projection image GP is not limited to one including Arabic numbers and Roman characters. For example, it is possible to display Chinese numerals as the number representing the size related to the projection image GP, or display Roman numerals as the number. Further, it is possible to display a character string including Chinese characters as the character string representing the unit of the size related to the projection image GP, or display a character string including Hangul characters as the character string.

2.2. Modified Example 2

In the embodiment and the modified example described above, there is illustrated when the camera 14 is disposed in the chassis 18, but the present disclosure is not limited to such an aspect. For example, it is possible for the camera 14 to be fixed to a place different from the chassis 18. It should be noted that when changing the positional relationship between the camera 14 and the projection mechanism 16, it is necessary to update the position information 104 depending on the circumstance.

2.3. Modified Example 3

In the embodiment and the modified examples described above, there is illustrated when the projection size information 111 is generated based on the taken image information 102 output from the imaging element 142 provided to the camera 14, but the present disclosure is not limited to such an aspect. For example, it is possible to generate the projection size information 111 using the ToF sensor instead of the camera 14. The ToF sensor outputs the information related to the distance from the ToF sensor to an object pixel by pixel. In other words, the coordinates of the plurality of dots included in the projection image GP are derived based on the information output from the ToF sensor. Further, based on the coordinates of the plurality of dots, the projection size information 111 is generated. In this case, the ToF sensor is an example of a "sensor."

3. Supplementary Notes

The conclusion of the present disclosure will hereinafter be described as supplementary notes.

3.1. Supplementary Note 1

A projection method including generating projection size information including at least one of first size information representing a distance between two dots included in a first projection image displayed on a projection surface, and second size information representing an area of a first image included in the first projection image based on information output from a sensor, and displaying a second projection image including an image showing a numerical value represented by the projection size information on the projection surface.

Specifically, the projection system realizing the projection method described in Supplementary Note 1 displays the image showing the numerical value represented by the projection size information on the projection surface. Thus, it is possible for the user to easily figure out the size related to the first projection image displayed on the projection surface. Therefore, it is possible for the user to easily adjust the size of the projection image to be displayed on the projection surface into a desired size by changing a position of a projection device provided to the projection system realizing the projection method described in Supplementary Note 1 while confirming the image showing the numerical value represented by the projection size information to be displayed on the projection surface.

3.2. Supplementary Note 2

The projection method described in Supplementary Note 1, wherein the projection size information includes the first size information, the first size information represents a length of a diagonal line of the first projection image, and the second projection image includes a character string representing that the numerical value represented by the projection size information is displayed in a first unit.

For example, the size of the image display area in a display device such as a television system is compared based on the length of the diagonal line. In other words, by the length of the diagonal line being displayed, it is possible for the user to easily compare the size of the first projection image and the size of the display device with each other. Further, the length of the diagonal line of the display device is generally displayed in an inch size. In other words, by the user being notified of the fact that the unit used when comparing the size of the image display area of the display device and the unit representing the size of the first projection image coincide with each other, it is possible for the user to more easily compare the size of the first projection image and the size of the display device with each other.

3.3. Supplementary Note 3

The projection method described in one of Supplementary Note 1 and Supplementary Note 2, wherein the first projection image is displayed by a projection mechanism projecting a second image on the projection surface, the sensor is an image sensor provided to a camera configured to take the first projection image, and generating the projection size information includes obtaining taken image information output from the sensor by taking the first projection image, and generating the projection size information based on position information representing a positional relationship between the camera and the projection mechanism, second image information representing the second image, and the taken image information.

In other words, the projection system for realizing the projection method described in Supplementary Note 3 is capable of generating the projection size information without using a special device such as a ToF sensor. Thus, it is possible for the projection system for realizing the projection method described in Supplementary Note 3 to display the image showing a numerical value represented by the projection size information at lower cost compared to when using the special device such as the ToF sensor.

3.4. Supplementary Note 4

The projection method described in Supplementary Note 3, wherein the camera and the projection mechanism are disposed in a chassis, and the chassis is provided with a storage device configured to store the position information.

In other words, the position information 104 is information inherent in the device, and is constant. Further, the position information 104 is figured out in advance. Thus, it is possible for the user to omit the operation of obtaining the position information 104 which becomes necessary when generating the projection size information.

3.5. Supplementary Note 5

The projection method described in one of Supplementary Note 3 and Supplementary Note 4, wherein generating the projection size information includes obtaining first coordinate information representing coordinates of a plurality of first dots included in the second image, and obtaining second coordinate information representing coordinates of a plurality of second dots which is included in a taken image represented by the taken image information, and which corresponds one-to-one to the plurality of first dots, and generating the projection size information based on the position information, the second image information, and the taken image information includes generating the projection size information based on the position information, the first coordinate information, and the second coordinate information.

In other words, the projection system for realizing the projection method described in Supplementary Note 5 generates the projection size information based on the correspondence relationship between the plurality of dots included in the second image and the plurality of dots included in the taken image. Thus, it is possible for the projection system for realizing the projection method described in Supplementary Note 5 to generate the projection size information high in accuracy.

3.6. Supplementary Note 6

The projection method described in Supplementary Note 5, wherein the second image includes a third image having a plurality of vertexes.

In other words, the projection system for realizing the projection method described in Supplementary Note 6 projects the second image to thereby display an image having the plurality of vertexes, namely an image corresponding to the third image, on the projection surface. Thus, in the taken image, there is included the image having the plurality of vertexes. Therefore, it is possible for the projection system for realizing the projection method described in Supplementary Note 6 to accurately detect the dots located at the plurality of vertexes included in the taken image. As a result, it is possible for the projection system for realizing the projection method described in Supplementary Note 6 to generate the projection size information higher in accuracy.

3.7. Supplementary Note 7

A projection system including a processing device, a sensor, and a projection mechanism, wherein the processing device is configured to execute generating projection size information including at least one of first size information representing a distance between two dots included in a first projection image displayed on a projection surface, and second size information representing an area of a first image included in the first projection image based on information output from the sensor, and controlling the projection mechanism to display a second projection image including an image showing a numerical value represented by the projection size information on the projection surface.

Specifically, the projection system described in Supplementary Note 7 displays the image showing the numerical value represented by the projection size information on the projection surface. Thus, it impossible for the user to easily figure out the size related to the first projection image displayed on the projection surface. Therefore, it is possible for the user to easily adjust the size of the projection image to be displayed on the projection surface into a desired size by changing a position of a projection device provided to the projection system described in Supplementary Note 7 while confirming the image showing the numerical value represented by the projection size information to be displayed on the projection surface.

What is claimed is:

1. A projection method comprising:

generating projection size information including at least one of first size information representing a distance between a first dot and a second dot included in a first projection image displayed on a projection surface, and second size information representing an area of a first image included in the first projection image based on information output from a sensor; and displaying a second projection image including an image showing a numerical value represented by the projection size information on the projection surface, wherein:

the first dot corresponds to one of vertices of the first projection image, the second dot corresponds to another of vertices of the first projection image, and the second projection image includes:

a fourth image of a diagram having a longitudinal direction that extends along a direction in which the first dot and the second dot are aligned; and a character string representing the numerical value of the first size information, and the character string is displayed along the fourth image.

2. The projection method according to claim 1, wherein the first size information represents a length of a diagonal line of the first projection image.

3. The projection method according to claim 1, wherein the first projection image is displayed by a projection mechanism projecting a second image on the projection surface, the sensor is an image sensor provided to a camera configured to take the first projection image, and generating the projection size information includes obtaining taken image information output from the sensor by taking the first projection image, and generating the projection size information based on position information representing a positional relationship between the camera and the projection mechanism, second image information representing the second image, and the taken image information.

4. The projection method according to claim 3, wherein the camera and the projection mechanism are disposed in a chassis, and the chassis is provided with a storage device configured to store the position information.

5. The projection method according to claim 3, wherein generating the projection size information includes obtaining first coordinate information representing coordinates of a plurality of third dots included in the second image, and obtaining second coordinate information representing coordinates of a plurality of fourth dots which is included in a taken image represented by the taken image information, and which corresponds one-to-one to the plurality of third dots, and generating the projection size information based on the position information, the second image information, and the taken image information includes generating the projection size information based on the position information, the first coordinate information, and the second coordinate information.

6. The projection method according to claim 5, wherein the second image includes a third image having a plurality of vertexes.

7. A projection system comprising:

a processing device;

a sensor; and a projection mechanism, wherein the processing device is configured to execute generating projection size information including at least one of first size information representing a distance between a first dot and a second dot included in a first projection image displayed on a projection surface, and second size information representing an area of a first image included in the first projection image based on information output from the sensor, and controlling the projection mechanism to display a second projection image including an image showing a numerical value represented by the projection size information on the projection surface, wherein:

the first dot corresponds to one of vertices of the first projection image, the second dot corresponds to another of vertices of the first projection image, and the second projection image includes:

a fourth image of a diagram having a longitudinal direction that extends along a direction in which the first dot and the second dot are aligned; and a character string representing the numerical value of the first size information, and the character string is displayed along the fourth image.

8. The projection system according to claim 7, wherein the first size information represents a length of a diagonal line of the first projection image.

9. The projection system according to claim 7, wherein the first projection image is displayed by the projection mechanism projecting a second image on the projection surface, the sensor is an image sensor provided to a camera configured to take the first projection image, and generating the projection size information includes obtaining taken image information output from the sensor by taking the first projection image, and generating the projection size information based on position information representing a positional relationship between the camera and the projection mechanism, second image information representing the second image, and the taken image information.

10. The projection system according to claim 9, wherein the camera and the projection mechanism are disposed in a chassis, and the chassis is provided with a storage device configured to store the position information.

11. The projection system according to claim 9, wherein generating the projection size information includes obtaining first coordinate information representing coordinates of a plurality of third dots included in the second image, and obtaining second coordinate information representing coordinates of a plurality of fourth dots which is included in a taken image represented by the taken image information, and which corresponds one-to-one to the plurality of third dots, and generating the projection size information based on the position information, the second image information, and the taken image information includes generating the projection size information based on the position information, the first coordinate information, and the second coordinate information.

12. The projection system according to claim 11, wherein the second image includes a third image having a plurality of vertexes.

* * * * *